United States Patent [19]

Ewen et al.

[11] Patent Number: 5,416,228

[45] Date of Patent: May 16, 1995

[54] PROCESS AND CATALYST FOR PRODUCING ISOTACTIC POLYOLEFINS

[75] Inventors: John A. Ewen, Houston; Michael J. Elder, Friendswood, both of Tex.

[73] Assignee: Fina Technology, Inc., Dallas, Tex.

[21] Appl. No.: 772,192

[22] Filed: Oct. 7, 1991
(Under 37 CFR 1.47)

[51] Int. Cl.⁶ .................. C07F 17/00; C07F 9/00; C07F 11/00
[52] U.S. Cl. .................................. 556/7; 556/11; 556/12; 556/1; 556/22; 556/23; 556/27; 556/28; 556/54; 556/43; 556/58; 556/56; 502/103; 502/117; 526/160
[58] Field of Search ............ 556/7, 11, 12, 22, 23, 556/27, 28, 54, 56, 43, 58, 1; 534/15; 502/103, 117

[56] References Cited

FOREIGN PATENT DOCUMENTS 0423101 4/1990 European Pat. Off. .
0316155 5/1990 European Pat. Off. .
0399347 11/1990 European Pat. Off. .

Primary Examiner—José G. Dees
Assistant Examiner—Porfirio Nazario
Attorney, Agent, or Firm—Jim D. Wheelington; M. Norwood Cheairs

[57] ABSTRACT

This invention is for a metallocene catalyst component useful in preparing isotactic polyolefins, a catalyst system using this component and a process for polymerizing olefins using the catalyst component. The catalyst component consists of a bridged metallocene in which one of the cyclopentadienyl rings is substituted in a different manner from the other ring. One of the cyclopentadienyl ligands contains a bulky group in one and only one distal position and the other cyclopentadienyl ligand has bilateral or pseudobilateral symmetry. There is a steric difference between the two Cp rings.

The catalyst component is a stereorigid metallocene described by the formula:

$$R''(CpR_n)(CpR'_m)MeQ_k$$

wherein each Cp is a cyclopentadienyl or substituted cyclopentadienyl ring; each $R_n$ and $R'_m$ is a hydrocarbyl radical having 1–20 carbon atoms; R'' is a structural bridge between the two Cp rings imparting stereorigidity to the Cp rings; Me is a transition metal; and each Q is a hydrocarbyl radical or is a halogen. $R'_m$ is selected so that $(CpR'_m)$ is a sterically different substituted cyclopentadienyl ring than $(CpR_n)$. The use of a metallocene catalyst component with sterically different cyclopentadienyl rings in which one and only one of the distal positions of the cyclopentadienyl rings has a bulky group as a substituent produces isotactic polymer.

10 Claims, 2 Drawing Sheets iPr[3-tBuCp(Flu)]ZrCl₂

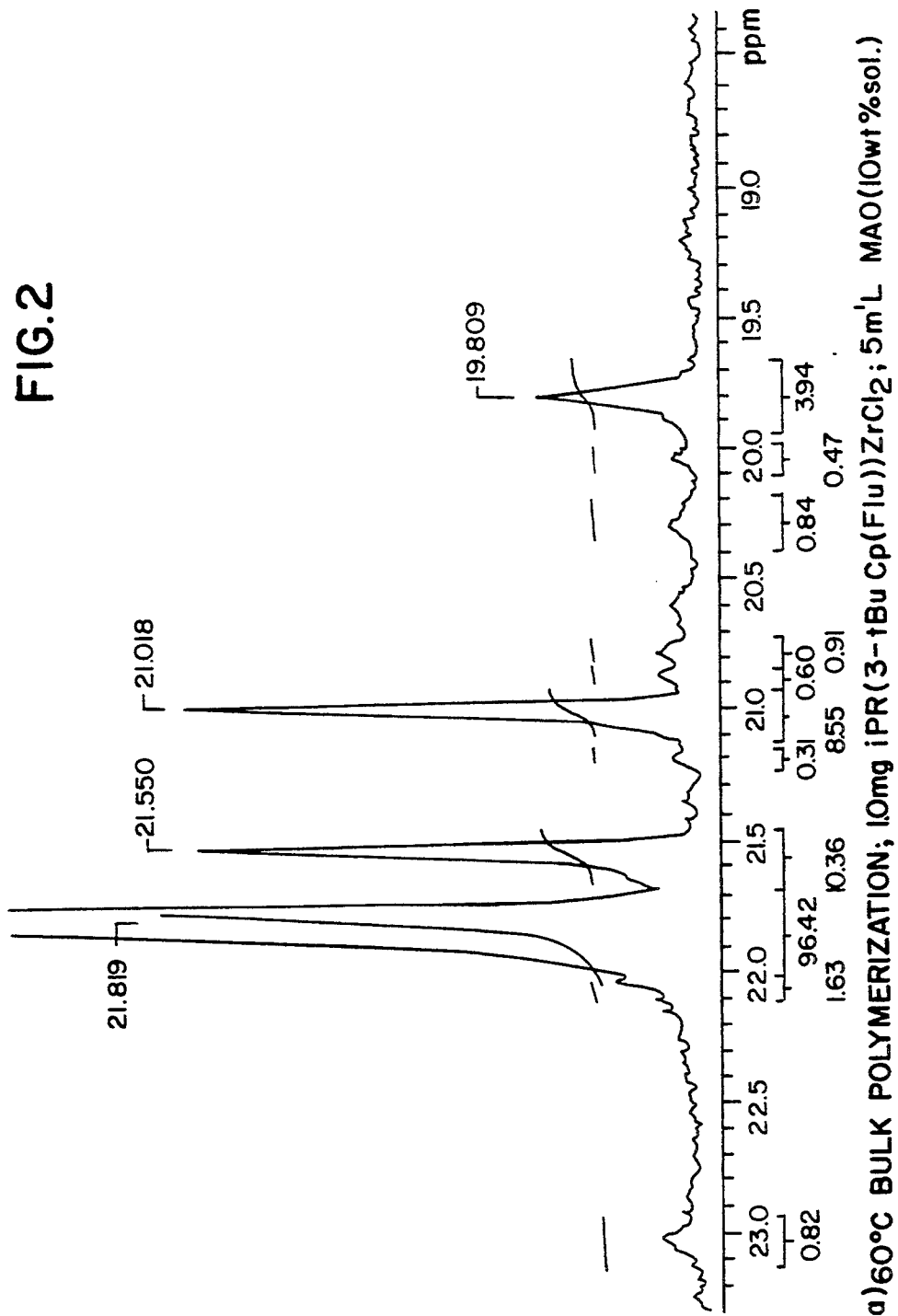

PROCESS AND CATALYST FOR PRODUCING ISOTACTIC POLYOLEFINS

BACKGROUND OF THE INVENTION

1. Field of the Invention

This invention relates to a metallocene catalyst component useful in preparing isotactic polyolefins. The catalyst component consists of a bridged metallocene in which one of the cyclopentadienyl rings is substituted in a different manner from the other ring. The invention further includes a process of preparing isotactic polyolefins that comprises the use of one or more of the disclosed catalyst components and also a process for preparing the catalyst components.

2. Description of the Prior Art

The present invention provides a catalyst and process for polymerizing olefins having three or more carbon atoms to produce a polymer with a isotactic stereochemical configuration. The catalyst and process are particularly useful in polymerizing propylene to form isotactic polypropylene. The isotactic structure is typically described as having the methyl groups attached to the tertiary carbon atoms of successive monomeric units on the same side of a hypothetical plane through the main chain of the polymer, e.g., the methyl groups are all above or all below the plane. Using the Fischer projection formula, the stereochemical sequence of isotactic polypropylene is described as follows:

Another way of describing the structure is through the use of NMR spectroscopy. Bovey's NMR nomenclature for an isotactic pentad is . . . mmmm . . . with each "m" representing a "meso" dyad or successive methyl groups on the same side in the plane. As known in the art, any deviation or inversion in the structure of the chain lowers the degree of isotacticity and crystallinity of the polymer.

In contrast to the isotactic structure, syndiotactic polymers are those in which the methyl groups attached to the tertiary carbon atoms of successive monomeric units in the chain lie on alternate sides of the plane of the polymer. Using the Fischer projection formula, the structure of a syndiotactic polymer is designated as:

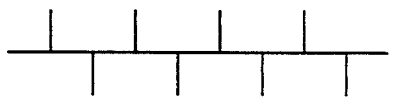

In NMR nomenclature, this pentad is described as . . . rrrr . . . in which each "r" represents a "racemic" dyad, i.e., successive methyl group on alternate sides of the plane. The percentage of r dyads in the chain determines the degree of syndiotacticity of the polymer. Syndiotactic polymers are crystalline and, like the isotactic polymers, are insoluble in xylene. This crystallinity distinguishes both syndiotactic and isotactic polymers from an atactic polymer that is soluble in xylene. Atactic polymer exhibits no regular order of repeating unit configurations in the polymer chain and forms essentially a waxy product.

While it is possible for a catalyst to produce all three types of polymer, it is desirable for a catalyst to produce predominantly isotactic or syndiotactic polymer with very little atactic polymer. Catalysts that produce isotactic polyolefins are disclosed in copending U.S. patent application Ser. No. 317,089 filed Feb. 28, 1989, and U.S. Pat. Nos. 4,794,096 and 4,975,403. This application and these patents disclosed chiral, stereorigid metallocene catalyst components that are used in the polymerization of olefins to form isotactic polymers and are especially useful in the preparation of a highly isotactic polypropylene. Catalysts that produce syndiotactic polyolefins are disclosed in U.S. Pat. No. 4,892,851. This patent discloses stereorigid metallocene catalyst components having sterically different cyclopentadienyl ligands used in the polymerization of olefins to form syndiotactic polymers and are especially useful in the preparation of highly syndiotactic polypropylene. Catalysts that produce hemi-isotactic polyolefins are disclosed in U.S. Pat. No. 5,036,034. This patent disclosed stereorigid metallocene catalyst components having a lack of bilateral symmetry used in the polymerization of olefins to form hemi-isotactic polymers and are especially useful in the preparation of hemi-isotactic polypropylene.

The isospecific metallocene catalyst components of the prior art did not exhibit bilateral symmetry of the cyclopentadienyl ligands. The syndiospecific metallocene catalyst components have bilateral symmetry or pseudo-bilateral symmetry of the cyclopentadienyl ligands. The hemi-isospecific catalyst components have bilateral symmetry or pseudo-bilateral symmetry in only one cyclopentadienyl ligand. The present invention, however, provides a different class of metallocene catalyst components that are useful in forming a catalyst for polymerization to produce isotactic polyolefins and, more particularly, isotactic polypropylene. The isospecific metallocene catalyst components of the present invention have bilateral symmetry or pseudo-bilateral symmetry in only one cyclopentadienyl ligand and bulky substituents on the other cyclopentadienyl ligand.

SUMMARY OF THE INVENTION

The present invention provides an isospecific catalyst, a process for preparing the catalyst and a polymerization process for preparing isotactic polyolefins, more particularly, isotactic polypropylene, using the catalyst. The novel catalyst component provided by the present invention is a stereorigid metallocene described by the formula:

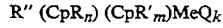

wherein each Cp is a cyclopentadienyl or substituted cyclopentadienyl ring; each $R_n$ and $R'_m$ is a hydrocarbyl radical having 1–20 carbon atoms; R" is a structural bridge between the two Cp rings imparting stereorigidity to the Cp rings; Me is a transition metal; and each Q is a hydrocarbyl radical or is a halogen. Further, $R'_m$ is selected so that $(CpR'_m)$ is a sterically different substituted cyclopentadienyl ring than $(CpR'_n)$. It was discovered that the use of a metallocene catalyst component with sterically different cyclopentadienyl rings in which one and only one of the distal positions of the cyclopentadienyl rings has a bulky group as a substituent produces isotactic polymer.

The present invention provides a process for producing isotactic polyolefins and, particularly, isotactic polypropylene, that comprises utilizing at least one of the catalyst components described by the above formula and introducing the catalyst into a polymerization reaction zone containing an olefin monomer. In addition, a cocatalyst such as alumoxane and/or an ionic compound capable of reacting with the metallocene to form a cationic metallocene may be introduced into the reaction zone. Further, the catalyst component may also be pre-polymerized prior to introducing it into the reaction zone and/or prior to the stabilization of reaction conditions in the reactor.

The present invention also includes a process for preparing a bridged metallocene component comprising contacting a cyclopentadienyl or substituted cyclopentadienyl with an alkylsilylchloride followed by a second equivalent of a different cyclopentadienyl or substituted cyclopentadienyl to produce a silicon bridged disubstituted cyclopentadienyl.

The present invention further includes a process for preparing a bridged metallocene catalyst component comprising contacting a substituted cyclopentadiene anion having bulky substituents on the cyclopentadienyl ring with a substituted cyclopentadiene anion having bilateral symmetry or pseudo-bilateral symmetry in one cyclopentadienyl ligand under reaction conditions sufficient to produce a bridged dicyclopentadiene or substituted dicyclopentadiene. The process further comprises contacting the bridged dicyclopentadiene with a metal compound of the formula $MeQ_k$ as defined above under reaction conditions sufficient to complex the bridged dicyclopentadiene to produce a bridged metallocene wherein Me is a Group IIIB, IVB, VB or VIB metal from the Periodic Table of Elements, each Q is a hydrocarbyl radical having 1–20 carbon atoms or is a halogen and k is the valence of Me minus 2.

BRIEF DESCRIPTION OF THE DRAWINGS

A more complete appreciation of the invention and many of the attendant advantages thereof will be readily understood by reference to the following detailed description when considered in connection with the accompanying drawings wherein:

FIG. 2 is an NMR spectra for the polymer produced in using iso-propyl(3-t-butyl cyclopentadienyl)(fluorenyl) zirconium dichloride.

DETAILED DESCRIPTION OF THE INVENTION

Figure 1:
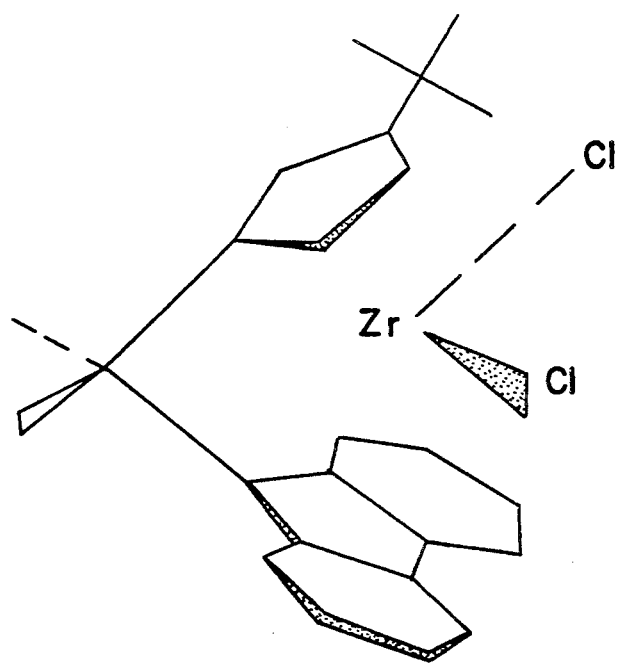
FIG. 1 is an illustration of the structure of a preferred catalyst component of the present invention and specifically shows iso-propyl (3-t-butyl-cyclopentadienyl)(fluorenyl) zirconium dichloride.

The present invention provides a catalyst and process for the production of isotactic polyolefins, particularly isotactic polypropylene. The catalyst components of the present invention are generally in a class which produces syndiotactic polyolefins, i.e., metallocenes with bilateral symmetry or pseudobilateral symmetry, as disclosed in U.S. Pat. No. 4,892,851; however, the catalyst components of the present invention unexpectedly produce isotactic polyolefins. One potential mechanism, without limiting the scope of the claims, is that one of the possible monomer coordination sites is blocked by a bulky group in one and only one distal position of one of the cyclopentadienyl ligands. "Bulky" is related to spatial displacement and in this invention means, preferably, having a spatial displacement greater than a methyl ($CH_3$) group and, more preferably, having a spatial displacement equal to or greater than a t-butyl group ($CH_3CH_3CH_3C$) group.

When propylene or other alpha-olefins are polymerized using a catalyst component consisting of a transition metal compound, the polymer product typically comprises a mixture of amorphous atactic and crystalline xylene insoluble fractions. The crystalline fraction may contain either isotactic or syndiotactic polymer, or a mixture of both. Highly iso-specific metallocene catalyst components are disclosed in copending U.S. application Ser. No. 317,089 and U.S. Pat. Nos. 4,794,096 and 4,975,403. Highly syndiospecific metallocene catalyst components are disclosed in U.S. Pat. No. 4,892,851. In contrast to the catalyst components disclosed in that patent, the catalyst components of the present invention are iso-specific and produce a polymer with a high isotactic index and higher molecular weight compared to polymer produced by other isospecific catalyst components.

The metallocene catalyst components of the present invention may be described by the formula $R''(CpR_n)(CpR'_m)MeQ_k$ wherein each Cp is a cyclopentadienyl or substituted cyclopentadienyl ring; $R_n$ and $R'_m$ are hydrogen or a hydrocarbyl radical having 1–20 carbon atoms, each $R_n$ may be the same or different, each $R'_m$ also may be the same or different and one $R_n$ or $R'_m$ is bulky group of the formula $AR^*_v$, where A is chosen from Group IVA, oxygen and nitrogen, preferably is carbon or silicon, most preferably is carbon, and $R^*$ is hydrogen or a hydrocarbyl radical from 1–20 carbon atoms, $R^*$ being the same or different, preferably is a methyl radical or phenyl radical, most preferably, is a methyl radical, in one and only one distal position where distal refers to position 3 or 4 of the cyclopentadienyl ring relative to the carbon attached to R" (position 1), v is the valence of A minus 1; R" is a structural bridge between the two Cp rings imparting stereorigidity to the Cp rings within the catalyst component and is preferably selected from the group-consisting of an alkyl radical having 1–4 carbon atoms or a hydrocarbyl radical containing silicon, germanium, phosphorus, nitrogen, boron, or aluminum; Me is a group IVB, VB or VIB metal from the Periodic Table of Elements; each Q is a hydrocarbyl radical having 1–20 carbon atoms or is a halogen; k is p−2 where p is the valence of Me; having $0 \leq n \leq 4$; and $1 \leq m \leq 4$.

An additional representation of the metallocene catalyst components of the present invention is:

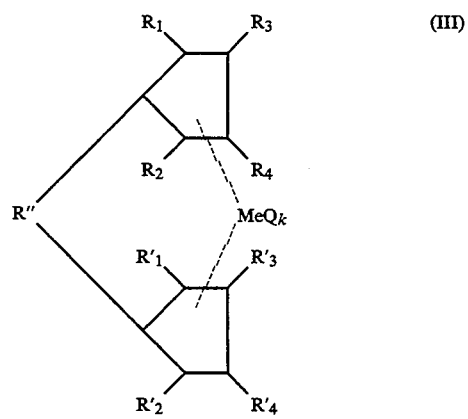

(III)

where R, R', R", Me, Q and k are as defined above.

The metallocene catalyst component may be supported or unsupported. The support can be any solid which is chemically inert and unreactive with the metallocene and the other catalyst components. Examples of support material are porous materials such as talc; inorganic oxides, such as Group IIA, IIIA, IVA or IVB metal oxides, specifically, silica, alumina, magnesia, titania, zirconia, and mixtures thereof; and resinous materials, such as polyolefins, specifically, finely divided polyethylene.

The Cp rings in the metallocene catalyst component must be substituted in a substantially different manner so that there is a steric difference between the two Cp rings, and therefore, $R'_m$ is selected such the $(CpR'_m)$ is a substantially different substituted ring than $(CpR_n)$. In order to produce a syndiotactic polymer, the characteristics of the groups substituted directly on the cyclopentadienyl rings seem to be important. Thus, by "steric difference" or "sterically different" as used herein, it is intended to imply a difference between the steric characteristics of the Cp rings that controls the approach of each successive monomer unit that is added to the polymer chain. The metal atom is chiral and can be labeled with the rotation R or S by extension of the Cahn-Ingold-Prelog rules. It is believed that the steric difference between the Cp rings may act to block the approaching monomer from a random approach and controls the approach such that the coordination sites alternate (R and S) during the polymerization giving the syndiotactic configuration. To produce an isotactic polymer instead of a syndiotactic polymer using this class of metallocenes, one of the cyclopentadienyl rings must have a bulky group in a distal position.

One of $(CpR_n)$ or $(CpR'_m)$ have bilateral symmetry or pseudobilateral symmetry and the other has a bulky substituent. Bilateral symmetry is defined as the condition in which there is no substituents or one or more substituents on one side and no substituents or one or more substituents on the other side in the same relative position such that a mirror image is formed from one side to another. One example of such a compound is isopropyl(3-t-butyl cyclopentadienyl-1-fluorenyl)zirconiumdichloride, abbreviated iPr[3-tBuCp(-Flu)]ZrCl$_2$. An illustration of the ligands of this compound are shown below:

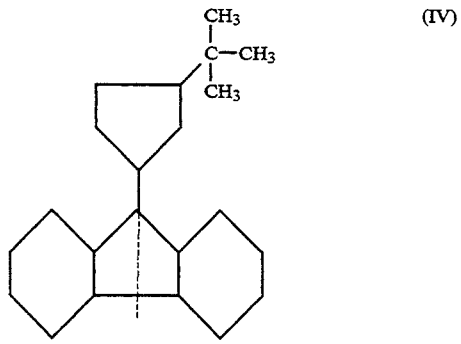

Bilateral symmetry is illustrated by the fluorenyl radical having its right side being a mirror image of its left side.

Pseudobilateral symmetry is defined as symmetry such that a mirror image exists from one side to the other in regard to the existence and position of substituents but the substituents themselves are not identical. This is illustrated below:

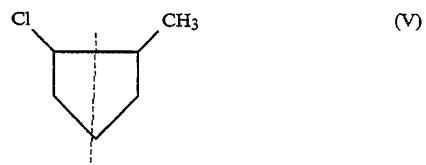

Pseudobilateral symmetry is illustrated by the substituents being in the same relative position, i.e., forming a mirror image as to location of substituents on the cyclopentadienyl ring, but the substituents are not the same.

Without intending to limit the scope of the present invention as indicated by the claims, it is believed that in the polymerization reaction the bulky group prevents both the catalyst and the approaching monomer units from isomerizing with each monomer addition to the polymer chain. This lack of dual isomerization of the monomer which is controlled by the steric blockage of the differently substituted Cp rings, one of which having a bulky group in a distal position, results in the successive configuration characteristic of isotactic polymers and is in contrast to the metallocene catalyst components disclosed in U.S. Pat. No. 4,892,851.

In a preferred catalyst of the present invention, Me is titanium, zirconium or hafnium; Q is preferably a halogen, and it is most preferably chlorine; and k is preferably 2. Exemplary hydrocarbyl radicals include methyl, ethyl, propyl, isopropyl, butyl, isobutyl, amyl, isoamyl, hexyl, heptyl, octyl, nonyl, decyl, cetyl, phenyl, and the like. Other hydrocarbyl radicals useful in the present catalysts include other alkyl, aryl, alkenyl, alkylaryl or arylalkyl radicals Further, $R_n$ and $R'_m$ may comprise hydrocarbyl radicals attached to a single carbon atom in the Cp rings as well as radicals that are bonded to two carbon atoms in the ring. Preferably, $R'_m$ is selected, such that $(CpR'_m)$ forms a fluorenyl, alkyl substituted indenyl or tetra-, tri-, or dialkyl substituted cyclopentadienyl radical and, most preferably, is a fluorenyl radical. Preferably $(CpR_n)$ is a cyclopentadienyl radical substituted with a group chosen from —C(CH$_3$)$_3$, —C(CH$_3$)$_2$Ph, —CPh$_3$ or —Si(CH$_3$)$_3$, most preferably is —C(CH$_3$)$_3$. FIG. 1 shows an illustration of the structure of a preferred catalyst component isopropyl(fluorenyl) (3-t-butyl cyclopentadienyl) zirconium dichloride. Preferably, R" is selected from the group consisting of an alkylene radical having 1-20 carbon atoms, a cyclic hydrocarbyl radical having 3-12 carbon atoms, an aryl radical, a diaryl methyl radical, a diaryl silyl radical, a silicon hydrocarbyl radical, a germanium hydrocarbyl radical, a phosphorus hydrocarbyl radical, a nitrogen hydrocarbyl radical, a boron hydrocarbyl radical, and an aluminum hydrocarbyl radical and more preferably is a methyl, ethyl, isopropyl, cyclopropyl, dimethylsilyl, methylene, ethylene or diphenylmethyl or diphenylsilyl radical.

The catalyst component may be prepared by any method known in the art. Two methods of preparing the catalyst component are discussed below with the second method being preferred as it produces a more stable and active catalyst. It is important that the catalyst complex be "clean" as usually low molecular weight, amorphous polymer is produced by impure catalysts. Generally, the preparation of the catalyst complex consists of forming and isolating the Cp or substituted Cp ligands which are then reacted with a halogenated metal to form the complex.

A process for preparing a bridged metallocene catalyst component comprises contacting a substituted cyclopentadiene having bulky substituents on the cyclopentadienyl ring with a substituted cyclopentadiene having bilateral symmetry or pseudo-bilateral symmetry in one cyclopentadienyl ring under reaction conditions sufficient to produce a bridged substituted dicyclopentadiene. The process further comprises contacting the bridged substituted dicyclopentadiene with a metal compound of the formula $MeQ_k$ as defined above under reaction conditions sufficient to complex the bridged dicyclopentadiene to produce a bridged metallocene wherein Me is a Group IIIB, IVB, VB or VIB metal from the Periodic Table of Elements, each Q is a hydrocarbyl radical having 1–20 carbon atoms or is a halogen and $0 \leq k \leq 4$. The process step of contacting the bridged substituted dicyclopentadiene with a metal compound can be performed in a chlorinated solvent.

Another process for preparing a bridged metallocene catalyst component comprises contacting a substituted cyclopentadiene having bulky substituents on the cyclopentadienyl ring with an alkylsilylchloride of the formula $R^{\cdot}_2SiX_2$ where $R^{\cdot}$ is a hydrocarbyl radical having 1–20 carbon atoms and X is an halogen. A second equivalent of a different substituted cyclopentadiene having bilateral symmetry or pseudo-bilateral symmetry in one cyclopentadienyl ring is added to produce a silicon bridged disubstituted cyclopentadiene. The subsequent steps are similar to those above for producing a bridged disubstituted cyclopentadiene coordinated to a metal.

The metallocene catalyst components of the present invention are useful in many of the polymerization processes known in the art including many of those disclosed for the preparation of isotactic polypropylene. When the catalyst components of the present invention are used in these types of processes, the processes produce isotactic polymers rather than syndiotactic polymers. Further examples of polymerization processes useful in the practice of the present invention include those disclosed in U.S. application Ser. No. 009,712, filed on Feb. 2, 1987, and now U.S. Pat. No. 4,767,735, and U.S. application Ser. No. 282,984, filed on Feb. 28, 1989, and now U.S. Pat. No. 4,975,403, the disclosures of which are hereby incorporated herein by reference. These preferred polymerization procedures include the step of prepolymerizing the catalyst component by contacting the catalyst component with a cocatalyst and an olefin monomer prior to introduction into a reaction zone at a temperature below that of polymerization.

Consistent with the prior disclosures of metallocene catalyst components for the production of isotactic polymers, the catalyst components of the present invention are particularly useful in combination with an aluminum cocatalyst, preferably an alumoxane, an alkyl aluminum, or other Lewis acids or a mixture thereof to form an active catalyst. In addition, a complex may be isolated between a metallocene catalyst component as described herein and an aluminum cocatalyst in accordance with the teachings of European Patent Publication No. 226,463, published on Jun. 24, 1987, and assigned to Exxon Chemical Patents, Inc. with Howard Turner listed as the inventor. As disclosed therein, a metallocene is reacted with an excess of alumoxane in the presence of a suitable solvent. A complex of the metallocene and alumoxane may be isolated and used as a catalyst in the present invention.

The alumoxanes useful in combination with the catalyst component of the present invention, either in the polymerization reaction or in forming the complex disclosed in Turner, may be represented by the general formula $(R—Al—O—)_n$ in the cyclic form and $R(R—Al—O)—_n—ALR_2$ in the linear form wherein R is an alkyl group with one to five carbon atoms and n is an integer from 1 to about 20. Most preferably, R is a methyl group. The alumoxanes can be prepared by various methods known in the art. Preferably, the are prepared by contacting water with a solution of trialkyl aluminum, such as, trimethyl aluminum, in a suitable solvent such as benzene. Another preferred method includes the preparation of alumoxane in the presence of a hydrated copper sulfate as described in U.S. Pat. No. 4,404,344, the disclosure of which is hereby incorporated by reference. This method comprises treating a dilute solution of trimethyl aluminum in toluene with copper sulfate. The preparation of other aluminum cocatalysts useful in the present invention may be prepared by methods known to those skilled in the art.

An alternative to the use of MAO co-catalyst is a catalyst system of a metallocene, a Lewis acid ionic ionizing agent and, optionally, an aluminum alkyl. Methods for preparing a cationic metallocene catalyst system are disclosed in U.S. patent application Ser. Nos. 419,057 and 419,222, which are hereby incorporated by reference. The ionizing agent which is an ion pair ionizes the metallocene to a cation. The metallocene cation forms on ion pair with the anion component of the ionizing agent. The segment of the metallocene compound removed by ionization forms an anion which associates with the cation component of the ionizing agent. The ion pair formed from the anion of the segment of metallocene and the cation of ionizing agent is chemically inert and non-reactive with regard to the metallocene cation and the metallocene cationionizing agent anion ion pair which is an active catalyst for polymerization of olefins.

An aluminum alkyl, such as triethyl aluminum, is useful in such an ionic catalyst system to improve yields. It is believed that aluminum alkyl acts to enhance the ionizing process and to scavenge catalyst poisons.

The Examples given below illustrate the present invention and its various advantages and benefits in more detail. Two different synthesis procedures, designated as I and II, are described. The synthesis procedures in both methods were performed under an inert gas atmosphere using a Vacuum Atmospheres glovebox or Schlenk techniques. The syntheses process generally comprises the steps of (1) preparing the halogenated or alkylated metal compound, (2) preparing the ligand, (3) synthesizing the complex, and (4) purifying the complex. The syntheses of the bridged, substituted dicyclopentadienyl ligand was accomplished by contacting fulvene or a substituted fulvene with a cyclopentadienyl or substituted cyclopentadienyl under reaction conditions sufficient to produce a bridged dicyclopentadiene or substituted dicyclopentadiene. As known in the art, fulvene is Cp=C in which a carbon atom is bound by a double bond to a cyclopentadienyl ring. Substituted fulvene as used herein is intended to mean $(CpR_a)=CR'_b$ wherein fulvene is substituted either on the Cp ring or at the terminal carbon atom or both $R_a$ and $R_b'$ are hydrocarbyl radicals, with each $R_a$ and $R_b'$ being the same or different, and $0 \leq a \leq 4$ and $0 \leq b \leq 2$.

The other three steps of the synthesis may be performed as shown below or other methods known in the art. The general formula for the catalyst component produced by these methods is iso-propyl(fluorenyl) (3-t-butyl cyclopentadienyl) MeCl$_2$ wherein Me is either zirconium or hafnium depending on the example. FIG. 1 shows the structure of the zirconium catalyst component. The hafnium catalyst component has essentially the same structure with Hf positioned in place of the Zr atom.

Method I (CH$_3$)$_2$Si[3-t-BuCp(Flu)]ZrCl$_2$ was prepared by adding 22 mL of 1.4M methyllithium in ether to 5.0 g of fluorene in 60 mL of pentane at 22° C. After 4 hours solvents were removed with a cannula and 60 mL of fresh pentane were added to the yellow solids. Dimethyldichlorosilane (6 Ml, 50 mmol) was syringed into the fluorenyllithium slurry at −78° C. After warming to room temperature, unreacted dimethyldichlorosilane and pentane were removed in vacuo. The remaining oil was dissolved in pentane without removing the LiCl and 3.6 g (30 mmol) of t-butylcyclopentadienyllithium were added as a 1.0M solution in THF. After stirring for 2 hours the reaction mixture was filtered and 60 mmol of butyllithium in hexane were added slowly to the filtrate. Stirring was continued for several hours. The dilithio salt of (CH$_3$)$_2$Si(3-t-BuCp)(Flu) was isolated by evaporating the solvents under reduced pressure and washing the remaining solids with hexane. The dilithio salt was reslurried in hexane and 6.5 g of ZrCl$_4$ were added and stirring continued for 12 hours. 11.8 g of the crude metallocene and LiCl were collected on a closed filter. The crude product was extracted with dichloromethane. (CH$_3$)$_2$Si[3-t-BuCp(Flu)ZrCl$_2$ was obtained as a yellow crystalline solid by concentrating and cooling the extract. $^1$H-NMR (CD$_2$Cl$_2$) ppm: 8.09 (t,2H), 7.59 (m, 4H) 7.29 (t,2H), 6.37 (broad singlet, 1H), 5.83 (broad singlet, 1H), 5.63 (broad singlet, 1H), 1.14, 1.12, 1.10 (three singlets, 15H).

Method II

In this process, methylene chloride is used as a noncoordinating solvent. The process described below uses zirconium as the transition metal, but the procedure is adaptable for use with hafnium, titanium or other transition metals. The substituted dicyclopentadienyl ligand was synthesized as follows: 13.7 g of fluorene was dissolved in 180 ml of THF and 35 ml of 2.5M of butyllithium was added slowly at 0° C. After stirring for one hour, 14 g of 3-t-butyl-6,6-dimethylfulvene in 40 ml of THF were added over the course of a one hour period. The solution was stirred for approximately 12 hours. 50 ml of water and the red THF solution were mixed together and stirred for 10 minutes. The organic layer was separated and dried over MgSO$_4$. The ether was evaporated leaving a yellow solid residue, a mixture of the iPr (3-tBuCp)(Flu) and fluorene. The fluorene was sublimed off. The dilithio salt of the ligand was prepared by adding 16.4 mmol of n-butyl lithium in hexane to 8.2 mmol of the ligand dissolved in 60 ml of ether and stirred for approximately 12 hours. The solvents were removed in vacuo and the red dilithio salt was washed with pentane. The solid dianion was redissolved in cold dichloromethane (−78° C.). An equivalent of ZrCl$_4$ slurried in dichloromethane (125 ml at −78 C.) was added by cannula. The reaction mixture gradually warmed to room temperature while stirring for approximately 12 hours. LiCl precipitated as a white solid which was filtered off. The filtrate was concentrated and cooled to 0°-20° C. After 14 hours, 1.2 g of iPr(3-t-BuCp)(Flu)ZrCl$_4$ were collected, washed with toluene, then with pentane and dried in vacuo. $^1$H-NMR (CD$_2$Cl$_2$) ppm: 8.12(d, 2H); 7.86 (d, 1H); 7.81 (d, 1H); 7.53 (m, 2H); 7.24 (m, 2H); 6.14 (t, 1H); 5.78 (t, 1H); 5.62 (t, 1H); 2.37 (s, 6H); 1.15 (s, 9H).

The invention having been generally described, the following examples are given as particular embodiments of the invention and to demonstrate the practice and advantages thereof. It is understood that the examples are given by way of illustration and are not intended to limit the specification or the claims to follow in any manner.

EXAMPLE 1

2.5 mg of iPr[3-tBuCp(Flu)]ZrCl$_2$ were dissolved in 5 mL of a 10 wt % MAO in toluene solution. The catalyst solution was transferred to a stainless steel sample cylinder and charged into an autoclave reactor, containing 500 mL of toluene thermostated at 30° C., with 100 psi of propylene. The contents of the reactor were stirred at 30° C. for one hour under 100 psi propylene pressure. At the end of this time polymerization was terminated by rapidly venting the reactor of unreacted monomer and opening the reactor to the air. Several hundred milliliters of methanol/4N HCl solution were added to the toluene slurry. The precipitated polymer was collected on a filter funnel and dried in a vacuum oven prior to analysis. The polymer analysis is shown in Table I.

EXAMPLE 2

1.0 mg of iPr[3-t-BuCp(Flu)]ZrCl$_2$ were dissolved in 5 mL of 10 wt % MAO in toluene, transferred to a stainless steel sample cylinder, and charged with 400 mL of propylene into an autoclave reactor containing 1000 mL of propylene stirring at room temperature. The catalyst was prepolymerized insitu by heating the reactor contents to 60° C. within 5 minutes. After stirring at 60° C. for one hour, the polymerization was terminated by rapidly venting the unreacted monomer and opening the reactor to the air. The contents of the reactor were dried in a vacuum oven prior to analysis. The polymer analysis is shown in Table I.

EXAMPLE 3

The same procedure as Example 1 was followed except 5.0 mg of Me$_2$Si[3-tBuCp(Flu)]ZrCl$_2$ were used. The polymer analysis is shown in Table I.

EXAMPLE 4

The same procedure of Example 2 was followed except 1.0 mg of Me$_2$Si[3-tBuCp(Flu)]ZrCl$_2$ was used and the polymerization time was 30 minutes. The polymer analysis is shown in Table I.

TABLE I

| Ex | Metallocene (mg) | Polymerization Temperature (°C.) | Efficiency (g/g-hr) | Intrinsic Viscosity* (dL/g) | Melting Point (°C.) |
| --- | --- | --- | --- | --- | --- |
| 1** | 2.5 | 30 | 4000 | 1.14 | 130 |

TABLE I-continued

| Ex | Metallocene (mg) | Polymerization Temperature (°C.) | Efficiency (g/g-hr) | Intrinsic Viscosity* (dL/g) | Melting Point (°C.) |
|---|---|---|---|---|---|
| 2** | 1.2 | 60 | 40000 | 0.93 | 125 |
| 3*** | 5.0 | 30 | 3000 | 1.29 | 161 |
| 4*** | 1.0 | 60 | 58000 | 0.81 | 148 |

*Intrinsic viscosity is in Decalin (Decahydronaphthalene) at 135° C.
**iPr[3-tBuCp(Flu)]ZrCl$_2$ - isopropyl[(3-t-butyl-cyclopentadienyl)(fluorenyl)]zirconium dichloride
***Me$_2$Si[3-t-BuCp(Flu)]ZrCl$_2$ - dimethylsilyl[(3-t-butyl-cyclopent-adienyl)(fluorenyl)]zirconium dichloride Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letter of Patent of the United States is:

1. A metallocene catalyst component for use in preparing isotactic polyolefins, said component described by the formula $$R''(CpR_n)(CpR'_m) MeQ_k$$

wherein each Cp is a substituted cyclopentadienyl ring; each $R_n$ is the same or different and is a hydrocarbyl radical having 1-20 carbon atoms; each $R'_m$ is the same or different and is a hydrocarbyl radical having 1-20 carbon atoms; $CpR'_m$ has bilateral or pseudobilateral symmetry and $R'_m$ is selected such that $(CpR'_m)$ forms a fluorenyl, alkyl substituted indenyl, or tetra-, tri-, or dialkyl substituted cyclopentadienyl radical and $CpR_n$ contains a bulky group in one and only one of the distal positions; R" is a structural bridge between the Cp rings imparting stereorigidity to the catalyst component; Me is a IVB, VB or VIB metal from the Periodic Table of Elements; each Q is a hydrocarbyl radical having 1-20 carbon atoms or is a halogen; k is p—2 where p is the valence of Me, $0 \leq n \leq 4$; $1 \leq m \leq 4$ wherein the bulky group is of the formula AR*$_v$, where A is chosen from Group IVA, oxygen and nitrogen and R* is a methyl radical or phenyl radical, R, being the same or different, and v is the valence of A minus 1.

2. The catalyst component of claim 1 wherein R* is a methyl radical.

3. The catalyst component of claim 1 wherein A is carbon or silicon.

4. The catalyst component of claim 3 wherein A is carbon.

5. The catalyst component of claim 1 wherein AR*$_v$ is selected from —C(CH$_3$)$_3$, —C(CH$_3$)$_2$Ph, —CPh$_3$ or —Si(CH$_3$)$_3$.

6. The catalyst component of claim 5 wherein AR*$_v$ is —C(CH$_3$)$_3$.

7. The catalyst component of claim 1 wherein R" is selected from the group consisting of an alkylene radical having 1-20 carbon atoms, a cyclic hydrocarbyl radical having 3-12 carbon atoms, an aryl radical, a diaryl methyl radical, a diaryl silyl radical, a silicon hydrocarbyl radical, a germanium hydrocarbyl radical, a phosphorus hydrocarbyl radical, a nitrogen hydrocarbyl radical, a boron hydrocarbyl radical, and an aluminum hydrocarbyl radical.

8. The catalyst component of claim 7 wherein R" is a methyl, ethyl, isopropyl, cyclopropyl, dimethylsilyl, methylene, ethylene, diphenylmethyl or diphenylsilyl radical.

9. The catalyst component of claim 1 wherein R"(CpR$_n$)(CpR'$_m$) forms an isopropyl(3-t-butyl cyclopentadienyl-1-fluorenyl) radical.

10. The catalyst component of claim 1 wherein Me is titanium, zirconium or hafnium.

* * * * *